(12) United States Patent
Wylie et al.

(10) Patent No.: US 7,925,927 B2
(45) Date of Patent: Apr. 12, 2011

(54) SIMULATOR FOR DETERMINING DATA LOSS IN A FAULT TOLERANT SYSTEM

(75) Inventors: John Johnson Wylie, San Francisco, CA (US); Kevin M. Greenan, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 12/262,032

(22) Filed: Oct. 30, 2008

(65) Prior Publication Data

US 2010/0115335 A1 May 6, 2010

Related U.S. Application Data

(60) Provisional application No. 61/074,790, filed on Jun. 23, 2008.

(51) Int. Cl.
*G06F 11/00* (2006.01)

(52) U.S. Cl. .................. 714/25; 714/5; 714/29; 714/42

(58) Field of Classification Search ................. 714/5, 6, 714/25, 29, 28, 33, 37, 42, 47, 48, 54; 711/114
See application file for complete search history.

(56) References Cited

U.S. PATENT DOCUMENTS

| | | | |
|---|---|---|---|
| 7,020,803 B2 * | 3/2006 | Wolin et al. | 714/41 |
| 7,412,641 B2 * | 8/2008 | Shokrollahi | 714/776 |
| 7,467,333 B2 * | 12/2008 | Keeton et al. | 714/41 |
| 2005/0066239 A1 * | 3/2005 | Keeton et al. | 714/47 |
| 2007/0245082 A1 * | 10/2007 | Margolus et al. | 711/114 |
| 2008/0222481 A1 * | 9/2008 | Huang et al. | 714/752 |
| 2008/0313241 A1 * | 12/2008 | Li et al. | 707/202 |
| 2009/0138309 A1 * | 5/2009 | Reynolds et al. | 705/7 |
| 2010/0100765 A1 * | 4/2010 | Vingralek | 714/6 |
| 2010/0146372 A1 * | 6/2010 | Tomlinson et al. | 714/780 |

* cited by examiner

*Primary Examiner* — Robert Beausoliel
*Assistant Examiner* — Joseph D Manoskey

(57) ABSTRACT

A fault tolerant system is simulated to determine the occurrence of data loss in the fault tolerant system. A list of erasure patterns corresponding to an erasure code implemented across the devices in the system is provided and a device event is simulated. The list of erasure patterns is updated based on the device event, and the occurrence of data loss is determined based on the updated list.

21 Claims, 5 Drawing Sheets

SIMULATOR FOR DETERMINING DATA LOSS IN A FAULT TOLERANT SYSTEM

CROSS REFERENCE TO RELATED APPLICATIONS

This Application claims the benefit of U.S. Provisional Application Ser. No. 61/074,790, filed Jun. 23, 2008, titled "Simulator For Determining Data Loss In A Fault. Tolerant System" which is hereby incorporated by reference herein as if reproduced in full below.

BACKGROUND

Network systems and storage devices need to reliably handle and store data and, thus, typically implement some type of scheme for recovering data that has been lost, degraded or otherwise compromised. At the most basic level, one recovery scheme could simply involve creating one or more complete copies or mirrors of the data being transferred or stored. Although such a recovery scheme may be relatively fault tolerant, it is not very efficient with respect to the need to duplicate storage space. Other recovery schemes involve performing a parity check. Thus, for instance, in a storage system having stored data distributed across multiple disks, one disk may be used solely for storing parity bits. While this type of recovery scheme requires less storage space than a mirroring scheme, it is not as fault tolerant, since any two device failures would result in an inability to recover any compromised data.

Thus, various recovery schemes have been developed with the goal of increasing efficiency (in terms of the amount of extra data generated) and fault tolerance (i.e., the extent to which the scheme can recover compromised data). These recovery schemes generally involve the creation of erasure codes that are adapted to generate and embed data redundancies within original data packets, thereby encoding the data packets in a prescribed manner. If such data packets become compromised, as may result from a disk or sector failure, for instance, such redundancies could enable recovery of the compromised data, or at least portions thereof. Various types of erasure codes are known, such as Reed-Solomon codes, RAID variants, array codes (e.g., EVENODD, RDP, etc.) and XOR-based erasure codes. However, encoding or decoding operations of such erasure codes often are computationally demanding, typically rendering their implementation cumbersome in network systems, storage devices, and the like.

In addition, determining the fault tolerance of a particular erasure code, and thus the best manner in which to implement a selected code can be challenging. For instance, fault tolerance determinations often do not factor in the fault tolerance of the devices themselves, thus leading to imprecision in assessing the actual fault tolerance of the recovery scheme. Thus, efforts to select an optimal erasure code implementation for a particular system could be impeded. Further, uncertainty regarding the fault tolerance of a particular code can impact the manner in which data is allocated among various storage devices and/or communication channels. Such uncertainty could hamper a user's ability to optimally store and/or allocate data across storage devices. Similarly, such uncertainty also could hamper efforts to allocate and route data across communication network channels, inasmuch as those systems could not function as desired. Moreover, the irregular fault tolerance of such erasure codes also makes evaluation of the reliability of a storage system challenging because of the need to accurately determine which sets of disk and sector failures lead to data loss.

BRIEF DESCRIPTION OF THE DRAWINGS

Some embodiments of the invention are described with respect to the following figures.

DETAILED DESCRIPTION

Figure 1:
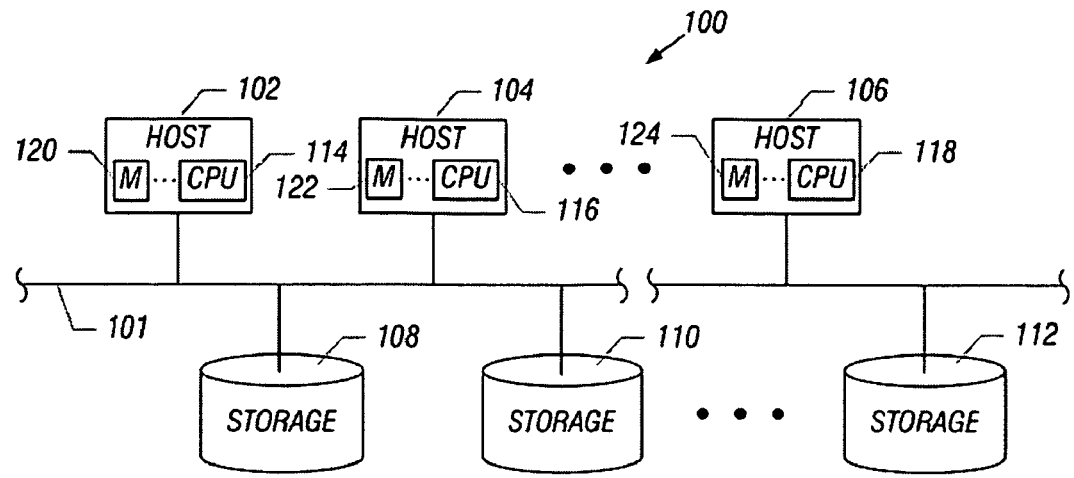
FIG. 1 illustrates a network of devices in accordance with an exemplary embodiment of the invention.

FIG. 1 illustrates an exemplary arrangement of a system of devices 100 which includes a plurality of computer hosts 102, 104, 106, and a plurality of storage devices 108, 110, 112. In one embodiment, the hosts 102, 104, 106 and storage devices 108, 110, 112 may be interconnected by a network 101. The network 101 may include, for example, a local area network (LAN), a wide area network (WAN), a storage area network (SAN), the Internet, or any other type of communication link. In addition, the network 101 may include system busses or other fast interconnects. The system 100 shown at FIG. 1 may be any one of an application server farm, a storage server farm (or storage area network), a web server farm, a switch or router farm, etc. Although three hosts 102, 104, 106 and three storage devices 108, 110, 112 are depicted in FIG. 1, it is understood that the system 100 may include more than three hosts and three storage devices, depending on the particular application in which the system 100 is employed. The hosts may be, for example, computers (e.g., application servers, storage servers, web servers, etc.), communications modules (e.g., switches, routers, etc.), and other types of machines. Although each of the hosts is depicted in FIG. 1 as being contained within a box, a particular host may be a distributed machine, which has multiple nodes that provide a distributed and parallel processing system. Further, each of the hosts 102-106 may include a CPU 114, 116, 118, such as a microprocessor, microcontroller, etc., and a memory 120, 122, 124 for storing various applications and data, for instance.

The storage devices 108-112 are adapted to store data associated with the hosts 102-106. Each of the hosts 102-106 could be coupled to one or more of the storage devices 108-112, and each of the hosts 102-106 could access the storage devices 108-112 for storing and/or retrieving data from those devices. Each of the storage devices 108-112 could be an independent memory bank. Alternatively, the devices 108-112 could be interconnected, thus forming a large memory bank or a subcomplex of a large memory bank. The devices 108-112 may be, for example, magnetic memory devices, optical memory devices, flash memory devices, etc., depending on the particular implementation of the system 100 in which the devices are employed.

In an exemplary embodiment, a single erasure code can be implemented across the plurality of hosts 102-106 and/or the plurality of storage devices 108-112 to recover data that has become damaged, lost, or otherwise compromised during transferring, storing, and/or retrieving operations implemented by the hosts 102-106 and/or the storage devices 108-112. The present invention provides for a simulation of the system 100 when a particular erasure code is implemented across the plurality of hosts 102-106 and/or the plurality of storage devices 108-112. Simulation of the system 100 with the erasure code implemented thereon enables evaluation of the reliability of the system 100, as well as a reliability comparison when different types of erasure codes are implemented on the system 100.

Figure 2:
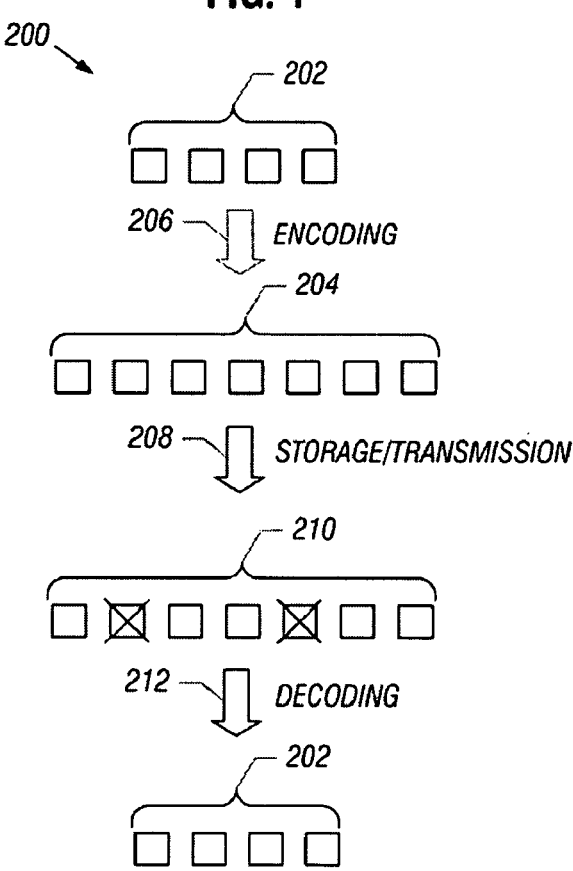
FIG. 2 illustrates encoding and decoding processes implemented by an erasure code in accordance with an exemplary embodiment of the invention.

FIG. 2 illustrates an erasure code encoding and decoding process 200 in accordance with an exemplary embodiment of the invention. The process 200 includes encoding and decoding steps performed by an erasure code for storing, retrieving and/or transferring data in the system 100. In accordance with one embodiment of the invention, the process 200 is implemented by a systematic erasure code, such as an XOR-based code, although other types of systematic erasure codes are contemplated. As illustrated in FIG. 2, an initial data set 202 is provided, which includes a strings of bits, bytes, or other symbols representing storable, retrievable, and/or transferable data or other information used by the system 100. The erasure code encodes the initial data set 202 into an encoded data set 204 as represented by the arrow 206. The arrow 206 represents the transformation process, which generally involves creating redundancies within the original data set 202, thereby increasing its size to form the encoded data set 204. The particular transformation process 206 employed is based on the erasure code used and the particular implementation of the system 100.

After encoding, the data set 204 may be stored, retrieved, and/or transferred, as indicated by the arrow 208. For instance, arrow 208 could correspond to transmitting the data set 204 between individual computers or to a user retrieving data from a server. Alternatively, arrow 208 could correspond to data transfer, storage, and/or retrieval operations occurring between the multiple communication and/or storage devices of the system 100. During the processes represented by arrow 208, the data set 204 could, for example, propagate through lossy communication channels or be stored in corrupted storage devices or storage devices which fail in whole or in part. Thus, some portion of the data set 204 could become lost or otherwise compromised, resulting in a degraded data set 210. As illustrated in FIG. 2, the data set 210 includes erasures (represented by the crossed-out portions), corresponding to those portions of the data set 204 which have been lost during the process 208. Depending on the erasure code used and the portions of the data loss, the original data set may be recoverable.

To recover the initial data set 202, a decoding process (represented by arrow 212) is applied to the degraded data set 210. Again, the particular decoding process employed depends on the erasure code being implemented. As the ability to recover the data depends on the erasure code used and which portions of the encoded data set 204 were lost (i.e., erasures), it may be possible that the initial data set 202 may not be recovered.

Patterns of erasures which lead to irrecoverable data loss relate to the fault tolerance of the erasure code. Systematic erasure codes, such as XOR-based codes, include n symbols, k of which are data symbols, and m of which are parity (or redundant) symbols. An erasure pattern is a set of erasures that results in at least one data symbol being irrecoverable (i.e., impossible to recover by any decoding method). An erasures list (EL) for an erasure code is a list of all of the code's erasure patterns. A minimal erasure is an erasure pattern for which every erasure is necessary for it to be an erasure pattern. That is, if any erasure is removed from a minimal erasure, then the minimal erasure is no longer an erasure pattern. A minimal erasures list (MEL) for an erasure code is the list of all of the code's minimal erasures.

In an exemplary embodiment of the invention, analysis of a particular erasure code to determine its erasure patterns is facilitated using a generator matrix and a Tanner graph that correspond to the erasure code. As known in the art, a generator matrix of a (k, m)-code is a k×(k+m) matrix in a Galois field of two elements. Addition of rows and columns in the generator matrix is done modulo 2, that is, in accordance with the XOR operation. The generator matrix consists of a k×k data submatrix and m columns of dimension k×1 appended to the data submatrix as a parity submatrix. Each of the m columns of the data submatrix corresponds to a stored data symbol. Likewise, each of the m columns in the parity submatrix corresponds to a stored parity symbol. A parity column p has a "1" in row i if and only if data symbol $s_i$ is XOR'ed to determine p. For example, if p=$s_2$ XOR $s_4$, the parity column p has a "1" in rows 2 and 4 and a "0" in all other rows. The erasure pattern induced by "1s" in the ith row of the generator matrix is referred to as the ith base erasure.

Figure 3:
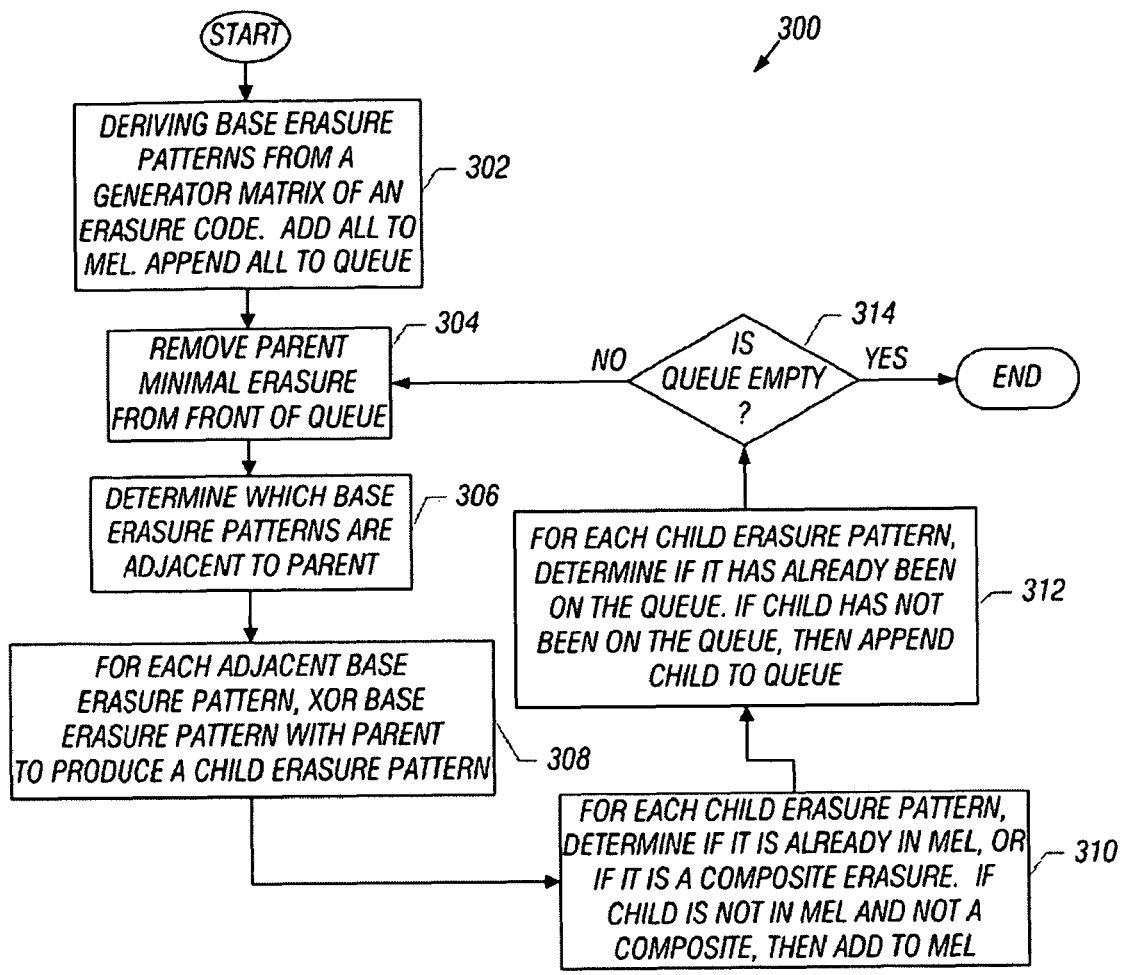
FIG. 3 is a flow diagram of a technique for determining the fault tolerance of an erasure code, in accordance with an exemplary embodiment of the invention.

FIG. 3 is a flowchart illustrating a technique 300 for determining the MEL of an XOR-based erasure code in accordance with an exemplary embodiment of the invention. Hereinafter, the technique 300 will be referred to as the minimal erasures technique. Using the generator matrix for a particular (k,m) erasure code, k base erasure patterns (one for each data symbol) of the erasure codes are derived/identified (block 302). The k base erasure patterns initially form a set of minimal erasures, which are referred to as parent minimal erasures, from which child erasures are further derived. All of the identified base erasures are added to the MEL and are thereafter appended to a queue. Next, at block 304, parent minimal erasures are removed from the queue. At block 306, the process 300 then determines which of the identified base erasure patterns are adjacent. Generally, a data symbol is considered to be adjacent to a minimal erasure if it is connected to a parity symbol in the minimal erasure. Stated otherwise, if two rows of a column of the parity submatrix have an entry of "1," then those two rows are considered adjacent.

Once the adjacent rows of the generator matrix are identified, those rows are XOR'ed with one another to produce child erasure patterns (block 308). Thus, for every minimal erasure found (i.e., for every parent erasure), a child erasure pattern for each adjacent row in the generator matrix is generated. Next, it is determined whether each of the generated child erasure patterns is already in the MEL or whether the child pattern is a composite erasure. Those skilled in the art will appreciate that a child erasure pattern is either a minimal erasure not yet in the MEL, a minimal erasure already in the MEL, or a composite erasure pattern. A composite erasure pattern is either a minimal erasure or the disjoint union of some minimal erasures. That is, a composite erasure pattern may be partitioned into minimal erasures. Accordingly, the child erasure patterns that either are not already in the MEL or are not composite erasure patterns are added to the MEL (block 310). Otherwise, a child erasure pattern generated at block 308 is not added to the MEL.

Next, it is determined whether those child erasure patterns that were added to the MEL at block 310 are already on the queue. If not, then the child erasure patterns are appended to the queue (block 312). If the queue on which previously generated erasure patterns were placed is not empty (diamond 314), then the technique 300 terminates. If the queue is not empty, then the process returns to block 304.

One implementation for generating the MEL according to the minimal erasures technique 300 is described in pending patent application Ser. No. 11/904,284, entitled "System and Method for Determining the Fault-Tolerance of an Erasure Code," filed Sep. 26, 2007. As one skilled in the art would recognize, other implementations of a technique for identifying the erasure list and/or minimal erasure list for a particular code also are possible.

The process 300 for generating an MEL for a particular XOR-based erasure code may be better understood with reference to the generator matrix below of an XOR-based code having k=4 and m=4. One possible generator matrix for such a code could be represented as:

$$\begin{bmatrix} s_1 & s_2 & s_3 & s_4 & p_1 & p_2 & p_3 & p_4 \\ 1 & 0 & 0 & 0 & 1 & 0 & 0 & 1 \\ 0 & 1 & 0 & 0 & 1 & 1 & 1 & 1 \\ 0 & 0 & 1 & 0 & 0 & 1 & 1 & 0 \\ 0 & 0 & 0 & 1 & 0 & 0 & 1 & 1 \end{bmatrix} \begin{matrix} \tilde{f}_{s1} \\ \tilde{f}_{s2} \\ \tilde{f}_{s3} \\ \tilde{f}_{s4} \end{matrix}$$

Table 1 below summarizes the execution of the technique 300 as applied to the above generator matrix:

TABLE 1

| Q.dequeue | $\hat{f}$ | M |
|---|---|---|
|  | $(s_1, p_1, p_4)$ | ✓ |
|  | $(s_2, p_1, p_2, p_3, p_4)$ | ✓ |
|  | $(s_3, p_2, p_3)$ | ✓ |
|  | $(s_4, p_3, p_4)$ | ✓ |
| $(s_1, p_1, p_4)$ | $(s_1, s_2, p_2, p_3)$ | ✓ |
|  | $(s_1, s_4, p_1, p_3)$ | ✓ |
| $(s_2, p_1, p_2, p_3, p_4)$ | $(s_1, s_2, p_2, p_3)$ | x |
|  | $(s_2, s_3, p_1, p_4)$ | ✓ |
|  | $(s_2, s_4, p_1, p_2)$ | ✓ |
| $(s_3, p_2, p_3)$ | $(s_2, s_3, p_1, p_4)$ | x |
|  | $(s_3, s_4, p_2, p_4)$ | ✓ |
| $(s_4, p_3, p_4)$ | $(s_1, s_4, p_1, p_3)$ | x |
|  | $(s_2, s_4, p_1, p_2)$ | x |
|  | $(s_3, s_4, p_2, p_4)$ | x |
| $(s_1, s_2, p_2, p_3)$ | $(s_1, s_2, s_3)$ | ✓ |
|  | $(s_1, s_2, s_4, p_2, p_4)$ | ✓ |
| ... | ... | ... |
| ... | ... | ... |

The first column of Table 1 lists the erasure pattern being processed. The second column lists the children of the corresponding base pattern. The third column indicates (via a checkmark) whether the child erasure pattern is inserted into the MEL and enqueued in the queue. The first four rows of the table illustrate the base erasures determined initially from the generator matrix and placed in the queue. The remaining rows of Table 1 illustrate the children generated by dequeuing the erasure patterns. These rows further indicate which child patterns are inserted into the MEL according to the criteria described above with reference to FIG. 3. The ellipsis at the bottom of Table 1 indicates that the minimal erasures algorithm continues for some number of iterations before terminating.

From Table 1, it can be seen that the MEL for the erasure code characterized by the above generator matrix includes the following minimal erasures: [$(s_1, p_1, p_4)$, $(s_3, p_2, p_4)$, $(s_4, s_3, p_4)$, $(s_1, s_2, s_3)$, $(s_1, s_2, p_2, p_3)$, $(s_1, s_4, p_1, p_3)$, $(s_2, s_4, p_1, p_2)$, $(s_2,$ $s_3, p_1, p_4)$, $(s_3, s_4, p_2, p_4)$]. Accordingly, for the above matrix, any f longer than m=4 is elided from the MEL.

Figure 4:
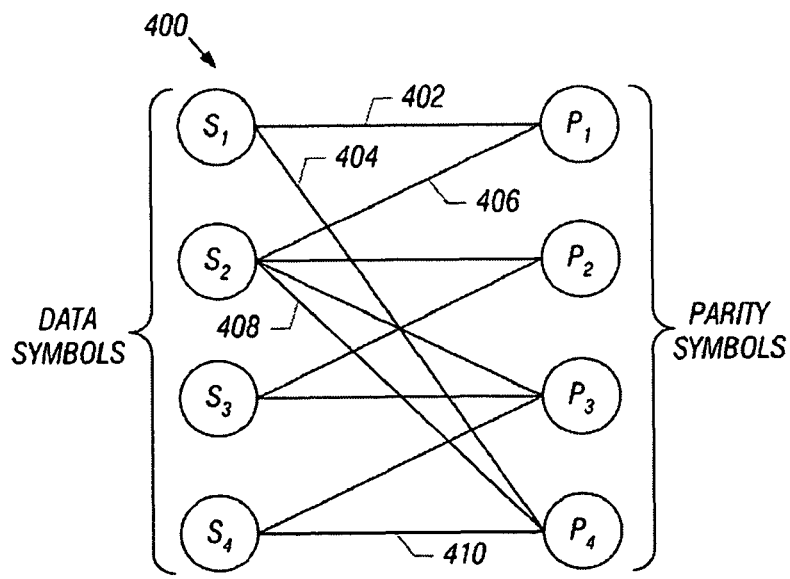
FIG. 4 is a Tanner graph representing an erasure code in accordance with an exemplary embodiment of the invention.

In addition to the generator matrix described above, a Tanner graph also may be generated to facilitate the determination of an MEL for a particular erasure code. A Tanner graph is a bipartite graph with k data symbols on one side, m data symbols on the other side, and a plurality of edges interconnecting the data symbols and parity symbols in accordance with the structure of the erasure code. A Tanner graph 400 that represents the structure of the erasure code described by the above generator matrix is illustrated in FIG. 4. For instance, for the first minimal erasure pattern corresponding to $(s_1, p_1, p_4)$, edges 402 and 404 connect data node $s_1$ to parity nodes $p_1$ and $p_4$, respectively. The Tanner graph may be used to determine adjacencies of rows of the generator matrix. From the Tanner graph illustrated in FIG. 4, it can be seen that symbols $s_2$ and $s_4$ are adjacent the erasure pattern $(s_1, p_1, p_4)$ since parity node $p_1$ also is connected to data node $s_2$ by edge 406 and parity node $p_4$ also is connected to data node $s_2$ and $s_4$ by edges 408 and 410, respectively. Those skilled in the art will appreciate that additional adjacencies can be derived in a similar manner so as to facilitate computations leading to the erasure patterns set forth in Table 1 from which the MEL for the erasure code is derived.

The Hamming distance of a code is an indicator of the fault tolerance of the code. For instance, for systematic codes, such as XOR-based erasure codes, a Hamming distance of 4 means that there exists some set of four erasures that will result in nonrecoverable data. However, not all sets of four erasures are nonrecoverable. Thus, a systematic code having a Hamming distance of 4 necessarily can tolerate at least three erasures (i.e., erasures of size i-1).

In an exemplary embodiment, an erasure code may be implemented in a storage array, such as the system 100 shown in FIG. 1. Each storage device 108-112 in system 100 will be referred to as a disk having multiple sectors. Each sector may have one or more storage blocks, each of which corresponds to a symbol of the code. It should be understood that, as used herein, a symbol may be considered erased if the data corresponding to that symbol is somehow corrupted during the data transfer, storage, and/or retrieval processes, or if the disk on which the symbol is stored fails, or if some of the disk's constituent sectors fails. The various fragments of a particular erasure code may be laid out across the disks 108-112 dependent to some extent on the type or class of the code. For instance, parity check array codes, Simple Product Codes, Weaver codes, and flat codes all are within the class of XOR-based erasure codes.

Parity check array codes include EVENODD codes, row-diagonal parity (RDP) codes, and X-Code. A parity check array code places multiple symbols per disk in a strip, which is a set of blocks related to each other on a single device. Related strips from each device collectively are referred to as a stripe. That is, a stripe is a set of related strips distributed across the devices. EVENODD and RDP codes are horizontal codes, meaning that a strip contains either data or parity symbols, but not both. X-Code is a vertical code, meaning that every strip contains a similar number of data and parity symbols. Simple Product Codes are Horizontal/Vertical codes, meaning that some strips are akin to vertical code strips, while others are akin to parity strips in a horizontal code. Weaver codes are vertical codes. Flat codes, such as low-density parity-check (LDPC) codes are horizontal XOR-based erasure codes with a single symbol per strip. To balance load due to parity updates among devices, both horizontal and Horizontal/Vertical codes may be rotated. This means that the strips in each successive stripe, or set of stripes, are rotated among the storage devices to distribute the number of data and parity symbols evenly among devices. The simulator described herein is configured to accurately determine and enable comparisons of the reliability of these various types of erasure codes, among others, when implemented across various fault tolerant systems, including storage systems, communication networks, etc.

Because XOR-based codes exhibit irregular fault tolerance (i.e., the codes can tolerate some erasures at or beyond the Hamming distance), reliability determinations based on simulations of the implementation of an XOR-based code across a multi-disk fault tolerant array can be challenging. Traditionally, Markov models and simulation methods have been the tools used for estimating system reliability. Typically, such methods involve identifying an appropriate Markov model, providing failure and recovery rates of the various system components to the models, and then determining the mean time to data loss (MTTDL). However, Markov models are an inappropriate tool for analyzing the reliability of multi-disk fault tolerant erasure codes because they do not take into account the effect of latent sector failures, scrubbing, and irregular fault tolerance in the reliability analysis and, thus, fail to take into account all pertinent details.

Figure 5:
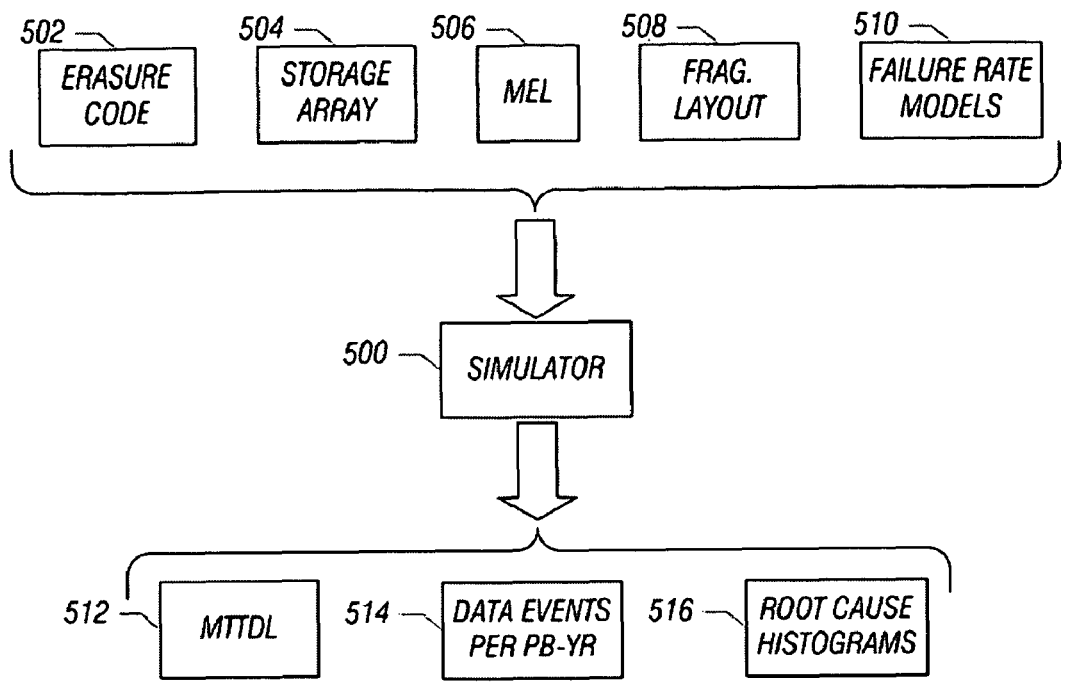
FIG. 5 is a block diagram of a simulator, in accordance with an embodiment of the invention.

Thus, in accordance with an embodiment of the invention, a simulator is provided which simulates the reliability of erasure codes with irregular fault tolerance that can tolerate two or more disk failures, with regard to both disk and sector failures. As shown in FIG. 5, inputs to a simulator 500 include a description of the erasure code 502 (i.e., k, m, Tanner graph, etc.); a description of the storage system array 504 (i.e., number of disks, capacity of each disk, number of sectors per symbol, and number of symbols per strip); the MEL 506 that has been generated for the code; a fragment layout 508 that maps symbols to strips for each stripe; and failure rate models 510 (i.e., disk failure rate, disk recovery rate, sector failure rate, and sector scrub rate). Not all inputs may be provided for all erasure codes. Further, various different models may be used for the failure rate distributions, such as exponential and Weibull distributions, models of the bit error rate during critical rebuilds (i.e., when no redundancy remains), models of the accrual of latent failures over time, etc. Yet further, other correlated failure rate models may be input to the simulator, such as rack failure rate models, power supply failure rate models, etc. Still further, in some embodiments, a fault tolerance vector which has been generated from the MEL 506 (as will be described below) also may be input to the simulator 500.

The output of the simulator 500 may include mean time to data loss (MTTDL) statistics 512, data loss events per petabyte-year 514, root cause histograms 516, etc. A root cause is a disk failures-sector failures pair that indicates the number of disk and sector failures that lead to the data loss event.

Figure 6:
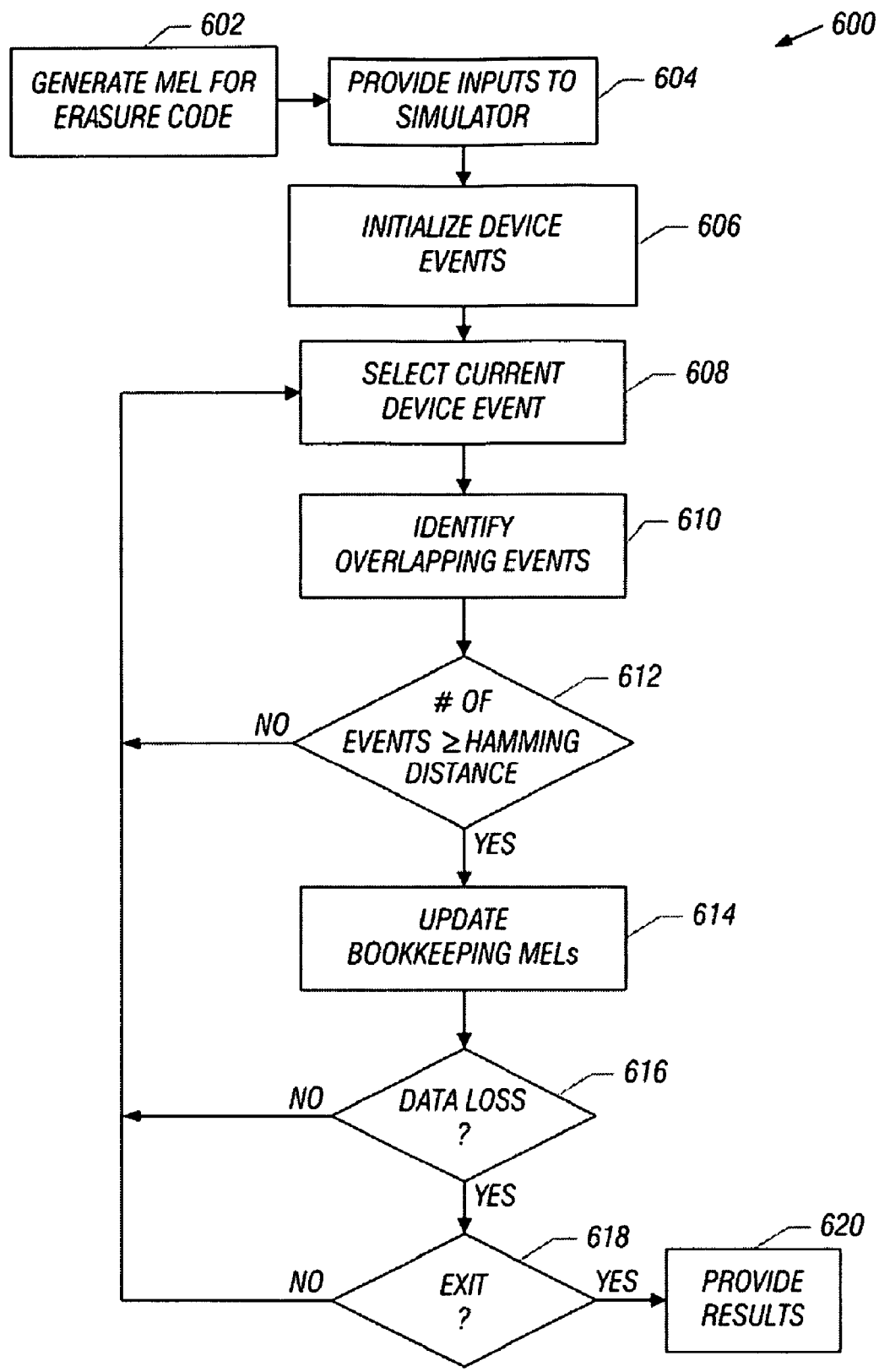
FIG. 6 is a flow diagram of a technique for simulating a fault tolerant system to determine data loss, in accordance with an embodiment of the invention.

With reference now to the technique 600 shown in the flow diagram of FIG. 6, the MEL 506 for the erasure code may be generated in accordance with the technique 300 described above (block 602). Once the MEL 506 and the various other inputs for storage system 100 are provided to the simulator 500 (block 604), the simulator is initialized by determining device events associated with the storage system (block 606). To initialize the device events, the failure times for each disk in the system are identified from the failure rate models. Once the failure time for a disk has been identified, a recovery time for the disk is determined. Sector failures are also determined for each disk up to the time of whole disk failure, and scrub times for each sector failure are determined. Disk and sector failures result in the loss of one or more symbols of the erasure code. These symbols may be recovered if a recovery of a disk or sector occurs before data is irretrievably lost from the storage system.

In one embodiment, failure and recovery times are organized into device events, where the failure time is the event start time, and the recovery time is the event end time. That is, the start time and end time of a disk event are disk failure and disk recovery, respectively. Sector events begin with a sector failure and end with a scrub. Thus, a total order of device (i.e., disk and sector) events is associated with each disk.

The device events are then analyzed to identify periods of interest, which are time periods during which there are a sufficient number of non-recovered lost symbols within some stripe to create a risk of data loss. The simulator 500 may track device events by maintaining a timeline of device events. During the simulation, the timeline begins with the selection of the first device event (block 608), such as the first sector failure (if one exists) or a first disk failure, and extends until the device recovery time, when it is replaced with a "new" device. If there is no risk of data loss before a currently lost symbol is recovered, then upon termination of the current device event, the next device event is identified. All events associated with the storage system are sorted by start time, allowing the simulator 500 to easily identify the next event.

To determine whether there is a risk of data loss (i.e., a period of interest), the simulator 500 determines whether any overlapping device events occur prior to a recovery (block 610). Once the overlapping device events result in a number of non-recovered lost symbols that exceeds a predefined threshold (thus indicating a risk of data loss) (block 612), then a period of interest exists. For instance, the predefined threshold may be the Hamming distance of the erasure code. When tracking or counting the number of overlapping device events, device recoveries (e.g., disk recoveries, sector scrubs, etc.) are taken into account. If a recovery event occurs, then the device event count may be decremented to ensure that the count reflects the current number of non-recovered lost symbols. In some embodiments, the device event count may be compared against multiple predefined thresholds. For instance, depending on the structure of the erasure code, it may be desirable to establish a first threshold for disk events and a second threshold for sector events.

If an insufficient number of events has occurred (e.g., a sector was scrubbed or a disk was recovered), then the period is not of interest, and the simulator instead selects the next "current" device event (block 608).

Once the number of overlapping device events resulting in non-recovered lost symbols reaches or exceeds the Hamming distance, then the simulator 500 may manipulate the MEL 506 of the erasure code to determine if the combination of device events has actually resulted in a data loss (block 614). In an embodiment of the invention, the simulator 500 maintains the original MEL 506 (referred to as the base MEL) that was input to the simulator, and then creates various bookkeeping MELs that are used to determine when data loss has occurred. The bookkeeping MELs may be maintained as bitmap arrays or as a list of entries, as will be further described below. The bookkeeping MELs may include a disk bookkeeping MEL that collectively accounts for all disk failures. The bookkeeping MELs may also include stripe bookkeeping MELs that are maintained for each stripe. Separate copies for each stripe are useful since independent sector failures in different stripes may not affect one another. Only one disk bookkeeping MEL may be maintained because a single disk failure affects all stripes in the array.

When a period of interest has been identified, and depending on the type of device event (e.g., a sector failure as opposed to a disk failure), the bookkeeping MELs are updated by removing the lost symbol(s) as is appropriate for the particular device event from each minimal erasure of which it (they) is (are) a member. If a symbol is later recovered (e.g., via a disk recovery or a sector scrub), the bookkeeping MELs again are updated. If, after updating the bookkeeping MELs, a zero entry results in any of the bookkeeping MELs, then data loss has occurred (diamond 616). For instance, a zero entry in a stripe MEL indicates that data has been lost in the corresponding stripe. A zero entry in the disk MEL may indicate that data has been lost on that disk from multiple stripes.

If data loss has not occurred, then the simulator 500 selects the next current device event from the total order of events for the storage system 100 (block 608). If data loss has occurred, then the simulator 500 determines whether an exit condition has been satisfied (diamond 618). An exit condition may be defined, for instance, as a total number of iterations of the simulation which has resulted in data loss, or the generation of an MTTDL that has been sufficiently stable over a selected number of iterations to provide statistically meaningful results. If the exit condition is not satisfied, then the simulator 500 returns to block 608 and selects the next device event. Otherwise, the simulation terminates and the results are provided (block 620), such as the MTTDL, the data loss events per petabyte-year, root cause histograms, etc.

In some embodiments, to increase the computational efficiency of the simulator, only low weight minimal erasures are included in the base MEL and/or the bookkeeping MELs. Low weight minimal erasures are minimal erasures within a few bits weight of the Hamming distance for the code. For instance, for a code with a Hamming distance of "3", only minimal erasures up to length "4" may be included in the MELs.

Figure 8:
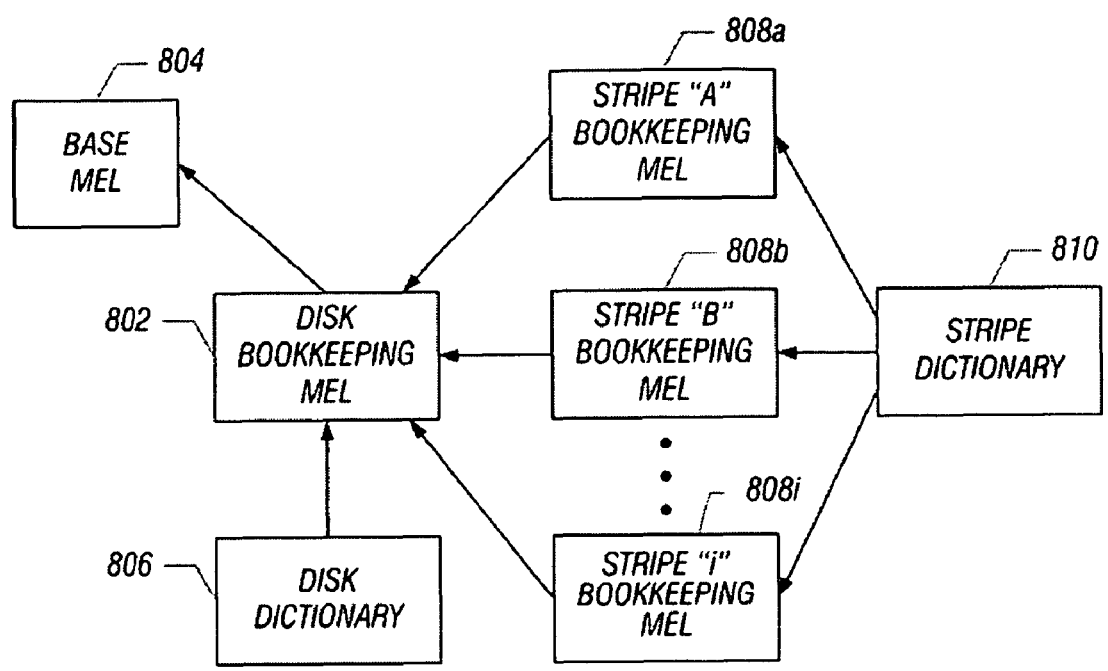
FIG. 8 is a block diagram representing the relationship between various data structures used in the simulation technique in FIG. 6, according to an embodiment of the invention.

The relationship of the various data structures used to perform the bookkeeping functions may be better understood with reference to FIG. 8. As shown in FIG. 8, a disk bookkeeping MEL 802 is derived from a base MEL 804. The base MEL 804 may be the MEL 502 generated for the erasure code or may be a subset of the MEL 502. In any event, the base MEL 804 is stored as a bitmap array or other data structure that then is never modified as a result of any of the bookkeeping tasks described herein. The disk bookkeeping MEL 802 also may be a bitmap array, but more preferably is a sparse data structure representing a list of entries. A disk dictionary 806 also may be created which (as will be explained below) facilitates updating of the disk MEL 802. Stripe bookkeeping MELs 808a-i also are generated to keep track of lost symbols within a particular stripe that result from sector failures. Like the disk MEL 802, the stripe MELs 808a-i may be maintained as either a bitmap array or as a data structure representing a list of entries. A stripe dictionary 810 also may be generated which indicates whether a stripe MEL 808a-i has been created for a particular stripe.

As an example of the bookkeeping performed using the various data structures represented in FIG. 8, consider a k=4, m=4 flat horizontal erasure code which is represented by the following generator matrix:

$$\begin{array}{cccccccc} s_1 & s_2 & s_3 & s_4 & p_1 & p_2 & p_3 & p_4 \end{array}$$
$$\begin{bmatrix} 1 & 0 & 0 & 0 & 1 & 0 & 0 & 1 \\ 0 & 1 & 0 & 0 & 1 & 1 & 1 & 1 \\ 0 & 0 & 1 & 0 & 0 & 1 & 1 & 0 \\ 0 & 0 & 0 & 1 & 0 & 0 & 1 & 1 \end{bmatrix}$$

This code is a flat horizontal code for which the data and parity symbols are distributed across eight disks D1, D2, D3, D4, D5, D6, D7 and D8 so that disk and sector failures are equivalent within a single stripe.

The MEL 502 for the above erasure code that is generated using the technique 300 is:

$[(s_1, p_1, p_4), (s_3, p_2, p_3), (s_4, p_3, p_4), (s_1, s_2, s_3), (s_1, s_2, p_2, p_3), (s_1, s_4, p_1, p_3), (s_2, s_4, p_1, p_2), (s_2, s_3, p_1, p_4), (s_3, s_4, p_2, p_4), (s_1, s_2, s_4, p_2, p_4), (s_1, s_3, s_4, p_1, p_2), (s_2, s_3, s_4, p_1, p_3), (s_2, p_1, p_2, p_3, p_4)]$

As mentioned previously, the base MEL 804 may be the same as the MEL 502 or may be a subset of the MEL 502. For instance, in some embodiments, the base MEL 804 and/or the bookkeeping MELs 802 and 808a-i may only include minimal erasures having a length that is close to the Hamming distance for the code. For the example provided here, the Hamming distance for the code corresponding to the MEL 502 is "3" and the disk bookkeeping MEL 802 includes only minimal erasures up to size "4".

The disk bookkeeping MEL 802 is generated from the base MEL 804 In this example, the disk bookkeeping MEL 802 is maintained as a list of entries, which appears as follows:

| Entry | Minimal Erasure |
|---|---|
| 0 | $(s_1, p_1, p_4)$ |
| 1 | $(s_3, p_2, p_3)$ |
| 2 | $(s_4, p_3, p_4)$ |
| 3 | $(s_1, s_2, s_3)$ |
| 4 | $(s_1, s_2, p_2, p_3)$ |
| 5 | $(s_1, s_4, p_1, p_3)$ |
| 6 | $(s_2, s_4, p_1, p_2)$ |
| 7 | $(s_2, s_3, p_1, p_4)$ |
| 8 | $(s_3, s_4, p_2, p_4)$ |

To further enhance the computational efficiency of the simulator 500, the disk dictionary 806 also may be created for the code. In essence, the dictionary 806 is a list of pointers to entries in the disk bookkeeping MEL 802. The pointers indicate each of the entries in the disk bookkeeping MEL 802 in which a particular symbol appears. Thus, for the disk bookkeeping MEL 802 above, the disk dictionary 806 is:

| Symbol | Entry in Bookkeeping MEL |
|---|---|
| $s_1$ | 0, 3, 4, 5 |
| $s_2$ | 3, 4, 6, 7 |
| $s_3$ | 1, 3, 7, 8 |
| $s_4$ | 2, 5, 6, 8 |
| $p_1$ | 0, 5, 6, 7 |
| $p_2$ | 1, 4, 6, 8 |
| $p_3$ | 1, 2, 4, 5 |
| $p_4$ | 0, 2, 7, 8 |

As can be seen above, the disk dictionary 806 indicates that symbol $s_1$ appears in entries 0, 3, 4 and 5 in the disk bookkeeping MEL 802; symbol $s_2$ appears in entries 3, 4, 6, and 7 in the disk bookkeeping MEL 802, and so forth. Thus, upon occurrence of a device event, such as the failure of disk D1 on which symbol $s_1$ is placed, the simulator 500 may refer to the disk dictionary 806 to determine that only entries 0, 3 4, and 5 in the disk bookkeeping MEL 802 need updating.

The following example illustrates the use of the disk bookkeeping MEL 802 and disk dictionary 806 to determine whether data loss has occurred. More specifically, consider the occurrence of the following series of disk failures: D1, D8, D6, D5. When disk D1 fails, symbol $s_1$ is lost, and the disk bookkeeping MEL 802 is updated. The disk dictionary 806 indicates that only entries 0, 3, 4 and 5 require updating. As a result, entries 0, 3, 4 and 5 in the disk bookkeeping MEL 802 is updated as follows:

| Entry | Minimal Erasure |
|---|---|
| 0 | $(p_1, p_4)$ |
| 1 | $(s_3, p_2, p_3)$ |
| 2 | $(s_4, p_3, p_4)$ |
| 3 | $(s_2, s_3)$ |
| 4 | $(s_2, p_2, p_3)$ |
| 5 | $(s_4, p_1, p_3)$ |
| 6 | $(s_2, s_4, p_1, p_2)$ |
| 7 | $(s_2, s_3, p_1, p_4)$ |
| 8 | $(s_3, s_4, p_2, p_4)$ |

When disk D8 fails, symbol $p_4$ is lost, and the disk dictionary 806 indicates that entries 0, 2, 7 and 8 in the disk bookkeeping MEL 802 should be updated as follows:

| Entry | Minimal Erasure |
|---|---|
| 0 | $(p_1)$ |
| 1 | $(s_3, p_2, p_3)$ |
| 2 | $(s_4, p_3)$ |
| 3 | $(s_2, s_3)$ |
| 4 | $(s_2, p_2, p_3)$ |
| 5 | $(s_4, p_1, p_3)$ |
| 6 | $(s_2, s_4, p_1, p_2)$ |
| 7 | $(s_2, s_3, p_1)$ |
| 8 | $(s_3, s_4, p_2)$ |

Likewise, when disk D6 fails, symbol $p_2$ is lost, and the disk dictionary 806 indicates that entries 1, 4, 6 and 8 should be updated in the disk bookkeeping MEL 802 as follows:

| Entry | Minimal Erasure |
|---|---|
| 0 | $(p_1)$ |
| 1 | $(s_3, p_3)$ |
| 2 | $(s_4, p_3)$ |
| 3 | $(s_2, s_3)$ |
| 4 | $(s_2, p_3)$ |
| 5 | $(s_4, p_1, p_3)$ |
| 6 | $(s_2, s_4, p_1)$ |
| 7 | $(s_2, s_3, p_1)$ |
| 8 | $(s_3, s_4)$ |

Finally, after disk D5 fails, symbol $p_1$ is lost, and the disk dictionary 806 indicates that entries 0, 5, 6 and 7 of the disk bookkeeping MEL 802 should be updated as follows, where the "( )" indicates that data has been irrecoverably lost (i.e., all symbols have been removed from a minimal erasure):

| Entry | Minimal Erasure |
|---|---|
| 0 | ( ) |
| 1 | $(s_3, p_3)$ |
| 2 | $(s_4, p_3)$ |
| 3 | $(s_2, s_3)$ |
| 4 | $(s_2, p_3)$ |
| 5 | $(s_4, p_3)$ |
| 6 | $(s_2, s_4)$ |
| 7 | $(s_2, s_3)$ |
| 8 | $(s_3, s_4)$ |

In the example described above, the disk bookkeeping MEL 802 is illustrated as a complete list of entries which are stored in memory. In some embodiments, to reduce the amount of data stored in memory, only entries in the disk bookkeeping MEL 802 that differ from the base MEL 804 are stored. The other entries in the disk bookkeeping MEL 802 instead simply provide pointers to the corresponding entry in the base MEL 804. Thus, for instance, after disk D1 fails in the example of the flat code above, the disk bookkeeping MEL 802 is as follows:

| Entry | Minimal Erasure |
|---|---|
| 0 | $(p_1, p_4)$ |
| 1 | Pointer to base MEL[1] |
| 2 | Pointer to base MEL[2] |
| 3 | $(s_2, s_3)$ |
| 4 | $(s_2, p_2, p_3)$ |
| 5 | $(s_4, p_1, p_3)$ |
| 6 | Pointer to base MEL[6] |
| 7 | Pointer to base MEL[7] |
| 8 | Pointer to base MEL[8] |

In some embodiments, to reduce the amount of data stored in memory, only entries in a stripe bookkeeping MEL 808$i$ that differ from the disk bookkeeping MEL 802 are stored. The other entries in a stripe bookkeeping MEL 808$i$ instead simply provide pointers to the corresponding entry in the disk bookkeeping MEL 802. Thus, for instance, if after disk D1 fails in the example above, a sector in stripe i on disk D8 fails, then symbol $p_4$ is lost and the stripe bookkeeping MEL 808$i$ is as follows:

| Entry | Minimal Erasure |
|---|---|
| 0 | $(p_1)$ |
| 1 | Pointer to disk bookkeeping MEL[1] |
| 2 | $(s_4, p_3)$ |
| 3 | Pointer to disk bookkeeping MEL[3] |
| 4 | Pointer to disk bookkeeping MEL[4] |
| 5 | Pointer to disk bookkeeping MEL[5] |
| 6 | Pointer to disk bookkeeping MEL[6] |
| 7 | $(s_2, s_3, p_1)$ |
| 8 | $(s_3, s_4, p_2)$ |

In one embodiment, the base MEL 804 is created and stored. Upon occurrence of a device event (i.e., either a disk event or a sector event), the disk MEL 802 is instantiated based on the base MEL 804 with all entries initialized as pointers to the base MEL 804. Upon occurrence of a sector event, a stripe MEL 808$i$ is instantiated with all entries initialized as pointers to the disk MEL 802. If the device event is a sector event, then all entries of the disk MEL 802 are pointers to the base MEL 804. In some embodiments, erasure codes with different structures may be implemented across the devices of the storage system, or a particular erasure code may be rotated across the devices of the storage system. In such embodiments, multiple disk MELs may be created, with each disk MEL corresponding to a particular implementation or structure of an erasure code used in the storage system.

Another example of the use of the MEL 502 to analyze data loss is provided by a k=4, m=5 array code which is represented by the following generator matrix:

$$\begin{bmatrix} s_1 & s_2 & s_3 & s_4 & p_1 & p_2 & p_3 & p_4 & p_5 \\ 1 & 0 & 0 & 0 & 1 & 0 & 1 & 0 & 1 \\ 0 & 1 & 0 & 0 & 1 & 0 & 0 & 1 & 1 \\ 0 & 0 & 1 & 0 & 0 & 1 & 1 & 0 & 1 \\ 0 & 0 & 0 & 1 & 0 & 1 & 0 & 1 & 1 \end{bmatrix}$$

Figure 7:
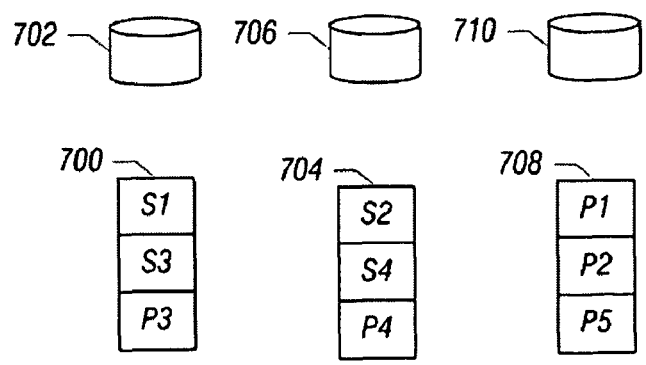
FIG. 7 is a diagram showing the fragment layout of an erasure code, according to an embodiment of the invention.

This code is a horizontal/vertical code which is laid out across three disks as shown in FIG. 7. Here, disk and sector failures are not equivalent, as a device failure may result in the loss of multiple symbols within a stripe, but all stripes are not necessarily affected in the same manner.

The MEL 502 for this code generated using technique 300 is:

$[(s_1, s_2, s_3, s_4), (s_1, s_2, p_3, p_4), (s_1, s_3, p_1, p_2), (s_1, p_1, p_3, p_5),$
$(s_2, s_4, p_1, p_2), (s_2, p_1, p_4, p_5), (s_3, s_4, p_3, p_4), (s_3, p_2, p_3,$
$p_5), (s_4, p_2, p_4, p_5), (s_1, s_2, s_3, p_2, p_4, p_5), (s_1, s_2, s_4, p_2, p_3,$
$p_5), (s_1, s_3, s_4, p_1, p_4, p_5), (s_1, s_4, p_1, p_2, p_3, p_4), (s_2, s_3, s_4,$
$p_1, p_3, p_5), (s_2, s_3, p_1, p_2, p_3, p_4)]$.

As in the example above, a base MEL 804 for the code is maintained as a bitmap array which may include all of the minimal erasures or only minimal erasures that are within a few bits weight of the code's Hamming distance. Here, a disk bookkeeping MEL 802 may be generated which includes the following entries:

| Entry | Minimal Erasure |
|---|---|
| 0 | $(s_1, s_2, s_3, s_4)$ |
| 1 | $(s_1, s_2, p_3, p_4)$ |
| 2 | $(s_1, s_3, p_1, p_2)$ |
| 3 | $(s_1, p_1, p_3, p_5)$ |
| 4 | $(s_2, s_4, p_1, p_2)$ |
| 5 | $(s_2, p_1, p_4, p_5)$ |
| 6 | $(s_3, s_4, p_3, p_4)$ |
| 7 | $(s_3, p_2, p_3, p_5)$ |
| 8 | $(s_4, p_2, p_4, p_5)$ |
| 9 | $(s_1, s_2, s_3, p_2, p_4, p_5)$ |
| 10 | $(s_1, s_2, s_4, p_2, p_3, p_5)$ |
| 11 | $(s_1, s_3, s_4, p_1, p_4, p_5)$ |
| 12 | $(s_1, s_4, p_1, p_2, p_3, p_4)$ |
| 13 | $(s_2, s_3, s_4, p_1, p_3, p_5)$ |
| 14 | $(s_2, s_3, p_1, p_2, p_3, p_4)$ |

The following disk dictionary 806 also may be generated:

| Symbol | Entry in Bookkeeping MEL |
|---|---|
| $s_1$ | 0, 1, 2, 3, 9, 10, 11, 12 |
| $s_2$ | 0, 1, 4, 5, 9, 10, 13, 14 |
| $s_3$ | 0, 2, 6, 7, 9, 11, 13, 14 |
| $s_4$ | 0, 4, 6, 8, 10, 11, 12, 13 |
| $p_1$ | 2, 3, 4, 5, 11, 12, 13, 14 |
| $p_2$ | 2, 4, 7, 8, 9, 10, 12, 14 |
| $p_3$ | 1, 3, 6, 7, 10, 12, 13, 14 |
| $p_4$ | 1, 5, 6, 8, 9, 11, 12, 14 |
| $p_5$ | 3, 5, 7, 8, 9, 10, 11, 13 |

The fragment layout 508 provided to the simulator 500 indicates that fragments $(s_1, s_3, p_3)$ are laid out in a strip 700 on disk 702; fragments $(s_2, s_4, p_4)$ are laid out in a strip 704 on disk 706; and fragments $(p_1, p_2, p_5)$ are laid out in a strip 708 on disk 710. Thus, if disk 702 fails, then the fragment layout 508 indicates that $s_1$, $s_3$ and $p_3$ will be lost. In this case, computational efficiency may be enhanced by utilizing the fragment layout. For instance, if disk 702 fails and $s_1$, $s_3$ and $p_3$ are lost, then the union of the set of pointers in the disk dictionary 806 may be calculated so that the simulator 500 can more efficiently determine which entries in the disk bookkeeping MEL 802 to update. Here, the union indicates that entries [0, 1, 2, 3, 6, 7, 9, 10, 11, 12, 13, 14] should be updated as follows as a result of the failure of disk 702:

| Entry | Minimal Erasure |
|---|---|
| 0 | $(s_2, s_4)$ |
| 1 | $(s_2, p_4)$ |
| 2 | $(p_1, p_2)$ |
| 3 | $(p_1, p_5)$ |
| 4 | $(s_2, s_4, p_1, p_2)$ |
| 5 | $(s_2, p_1, p_4, p_5)$ |
| 6 | $(s_4, p_4)$ |
| 7 | $(p_2, p_5)$ |
| 8 | $(s_4, p_2, p_4, p_5)$ |
| 9 | $(s_2, p_2, p_4, p_5)$ |
| 10 | $(s_2, s_4, p_2, p_5)$ |
| 11 | $(s_4, p_1, p_4, p_5)$ |
| 12 | $(s_4, p_1, p_2, p_4)$ |
| 13 | $(s_2, s_4, p_1, p_5)$ |
| 14 | $(s_2, p_1, p_2, p_4)$ |

As data has not yet been irrecoverably lost in the example provided above, the simulator 500 repeats another iteration of evaluating device events in the manner described above.

Stripe bookkeeping MELs 808a-i may only be created if a sector failure occurs during a period of interest that is under evaluation by the simulator 500. To track whether a stripe bookkeeping MEL 808 for a particular stripe has been created, a stripe dictionary or lookup table may be used. Thus, when a sector failure occurs within a stripe, the simulator 500 refers to the stripe dictionary 810 to determine if a stripe bookkeeping MEL 808 has been created for that stripe. If the stripe bookkeeping MEL 808 already exists, then the entries in the stripe MEL 808 are updated based on the sector failure. If the stripe MEL 808 does not already exist, then a stripe MEL is created with entries that reflect the current sector failure.

As with the disk bookkeeping MEL 802, the stripe bookkeeping MELs 808a-i may be maintained either as a bitmap array or as a list of entries corresponding to the stripe. Also, as with the disk bookkeeping MEL 802, the stripe bookkeeping MELs 808a-i may only store in memory entries that differ from the disk bookkeeping MEL 802. Entries that are the same as the disk bookkeeping MEL simply point to the appropriate entry in the disk bookkeeping MEL 802.

When updating the disk MEL 802 and the stripe MELs 808a-i when the number of lost symbols reaches the predefined threshold, all disk events may first be treated, followed by sector events. The simulator 500 also may account for situations in which disk recoveries and sector scrubs, as well as additional disk or sector failures, occur prior to the end of the period of interest. In such a case, a disk failure may result in manipulation of both the disk bookkeeping MEL 802 and any corresponding stripe bookkeeping MEL 808. If a stripe is recovered, then the corresponding stripe bookkeeping MEL 808 is deleted and the stripe dictionary 810 updated to reflect the deletion of the stripe MEL 808. Once a period of interest is over, then disk recoveries result in deletion of the disk bookkeeping MEL 802 and all of the stripe bookkeeping MELs 808.

In some embodiments, rather than waiting until the number of device events or non-recovered symbols reaches a predefined threshold, the disk MEL 802 and stripe MELs 808 may be updated every time a device event occurs.

In yet other embodiments, the simulator may perform even lighter weight bookkeeping if additional analysis of the code is performed before the simulation is run. For instance, the simulator may use a fault tolerance vector to determine if a given set of disk and sector failures constitute a data loss event. The erasure list for a code may be directly translated into a fault tolerance vector. A fault tolerance vector indicates the probability that some number of symbol failures results in data loss. For codes with multiple symbols per strip (i.e., array codes), the fault tolerance matrix is used to test if strip failures lead to data loss. A fault tolerance matrix is used to determine if sector failures in conjunction with strip failures lead to data loss. The jth row of the fault tolerance matrix is the symbol fault tolerance vector given that j strips have failed. As an example, for a traditional double disk fault tolerant parity check array code such as EVEN-ODD, the fault tolerance vector is (0, 0, 0, 1) indicating that all single and double strip failures are tolerated, but no triple strip failures are tolerated. In this example, the first row of the fault tolerance matrix begins (0, 0, 0, x, . . . ), indicating that with probability x, a triple symbol failure leads to data loss. The second row begins (0, 0, y, . . . ), indicating that with probability y, a single strip failure in conjunction with a double symbol failure leads to data loss. The third row begins (0, 1, 1, . . . ), indicating that a double strip failure with any symbol failure leads to data loss. Finally, a fourth row is (1, 1, . . . ) and captures the loss of three strips, which in the case of EVEN-ODD leads to data loss. Only the first couple non-zero entries in each row of the fault tolerance matrix are required for accuracy. Truncating the fault tolerance vector and matrix reduces the amount of processing necessary before running a simulation.

The simulator 500 described herein may be implemented as a standalone tool for evaluating the reliability of erasure codes implemented on various storage systems. Other uses of the simulator 500 also are envisioned, such as embedding the simulator 500 as a management tool in a storage system (such as system 100) to track failure events, predict data loss events, and/or provide for the evaluation of alternative configurations in a real-time manner.

Instructions of software described above (including the technique 300 of FIG. 3 and the technique 600 of FIG. 6) are loaded for execution on a processor (such as one or more CPUs 114-118 in FIG. 1). The processor may include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data, data structures, and instructions (of the software) are stored in respective storage devices, which are implemented as one or more computer-readable or computer-usable storage media (such as one or more memories 120-124 in FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the data, data structures and instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of simulating a fault tolerant system to determine occurrence of a data loss, comprising:
   providing a list of erasure patterns corresponding to an erasure code implemented across a plurality of devices in a fault tolerant system;
   simulating a device event in the fault tolerant system;
   updating the list of erasure patterns based on the device event; and
   determining occurrence of a data loss in the fault tolerant system based on the updated list of erasure patterns.

2. The method as recited in claim 1, further comprising:
   providing failure models corresponding to the devices in the fault tolerant system;
   simulating device events based on the failure models; and
   updating the list of erasure patterns when a number of device events resulting in a risk of data loss reaches or exceeds a predefined threshold.

3. The method as recited in claim 2, wherein the predefined threshold is a Hamming distance for the erasure code.

4. The method as recited in claim 1, wherein the erasure code comprises a plurality of symbols implemented across the plurality of devices, and the method further comprises:
   identifying loss of at least one symbol resulting from the device event, wherein updating the list of erasure patterns comprises removing at least one symbol from the list of erasure patterns.

5. The method as recited in claim 4, wherein the list of erasure patterns is a list of minimal erasures, and wherein a data loss in the fault tolerant system is determined when all of the symbols have been removed from at least one of the minimal erasures.

6. The method as recited in claim 1, wherein the fault tolerant system comprises a storage system and the plurality of devices comprises a plurality of storage devices.

7. A method of simulating a storage system to determine occurrence of a data loss in the fault tolerant system, comprising:
   providing a list of minimal erasures corresponding to an erasure code having a plurality of symbols implemented across a plurality of storage devices in a storage system;
   providing failure models corresponding to the storage devices;
   creating a bookkeeping minimal erasures list (MEL) based on the list of minimal erasures, the bookkeeping MEL comprising a plurality of entries corresponding to the minimal erasures;
   simulating a plurality of device events based on the failure models that result in a risk of data loss;
   updating the bookkeeping MEL based on the simulated device events; and determining occurrence of a data loss from the storage system based on the updated bookkeeping MEL.

8. The method as recited in claim 7, wherein each device event comprises a failure event and a recovery event, the failure event resulting in loss of at least one symbol of the erasure code, and the recovery event resulting in recovery of at least one lost symbol of the erasure code, and wherein the bookkeeping MEL is updated when a number of non-recovered lost symbols reaches or exceeds a predefined threshold.

9. The method as recited in claim 8, wherein the predefined threshold is a Hamming distance of the erasure code.

10. The method as recited in claim 8, wherein updating the bookkeeping MEL comprises removing any non-recovered lost symbols from the bookkeeping MEL, and wherein a loss of data is determined when all symbols have been removed from at least one entry in the updated bookkeeping MEL.

11. The method as recited in claim 7, comprising continuing simulation of device events until a loss of data from the storage system is determined.

12. An article comprising a computer-accessible storage medium containing instructions that when executed by a processor-based system cause the processor-based system to:
generate a list of minimal erasures corresponding to an erasure code having a plurality of symbols;
simulate device events in a storage system comprising a plurality of storage devices, wherein the plurality of symbols is implemented across the storage devices;
track a number of symbols lost as a result of the device events;
update the list of minimal erasures when the number of lost symbols reaches or exceeds a predefined threshold; and
determine occurrence of a data loss from the storage system based on the updated list.

13. The article as recited in claim 12, wherein the predefined threshold is a Hamming distance of the erasure code.

14. The article as recited in claim 12, wherein the list of minimal erasures is updated by removing the lost symbols from the minimal erasures.

15. The article as recited in claim 12, wherein the occurrence of a data loss is determined when all symbols have been removed from at least one minimal erasure in the list of minimal erasures.

16. A method of simulating a fault tolerant system to determine occurrence of a data loss, comprising:
providing a list of erasure patterns corresponding to an erasure code implemented across a plurality of devices in a fault tolerant system;
providing failure models corresponding to the devices in the fault tolerant system;
simulating device events based on the failure models;
updating the list of erasure patterns when a number of device events resulting in a risk of data loss reaches or exceeds a Hamming distance of the erasure code; and
determining occurrence of a data loss in the fault tolerant system based on the updated list of erasure patterns.

17. The method as recited in claim 16, wherein the list of erasure patterns is a list of minimal erasures.

18. The method as recited in claim 16, wherein the erasure code comprises a plurality of symbols implemented across the plurality of devices, and the method further comprises:
identifying loss of at least one symbol resulting from a device event, wherein updating the list of erasure patterns comprises removing the at least one symbol from the list of erasure patterns.

19. A method of simulating a fault tolerant system to determine occurrence of a data loss, comprising:
providing a list of minimal erasure patterns corresponding to an erasure code implemented across a plurality of devices in a fault tolerant system;
simulating a device event in the fault tolerant system;
updating the list of minimal erasure patterns based on the device event; and
determining occurrence of a data loss in the fault tolerant system based on the updated list of minimal erasure patterns.

20. The method as recited in claim 19, wherein the erasure code comprises a plurality of symbols implemented across the plurality of devices, and the method further comprises:
identifying loss of at least one symbol resulting from the device event, wherein updating the list of minimal erasure patterns comprises removing at least one symbol from the list of minimal erasure patterns.

21. The method as recited in claim 20, wherein a data loss in the fault tolerant system is determined when all of the symbols have been removed from at least one of the minimal erasure patterns.

* * * * *